Patented May 22, 1945

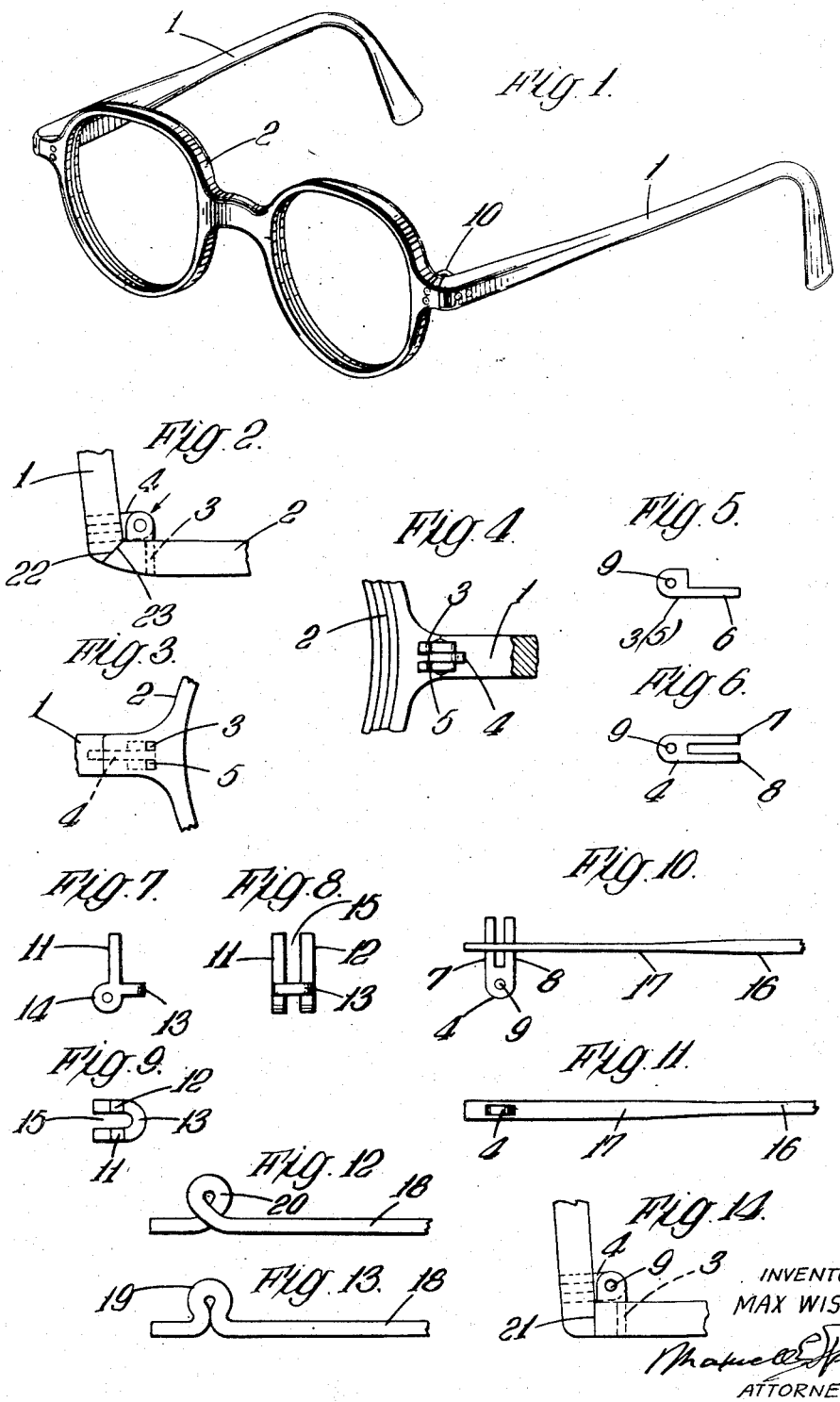

2,376,468

UNITED STATES PATENT OFFICE 2,376,468

SPECTACLE HINGE

Max Wiseman, London, England

Application October 10, 1942, Serial No. 461,535
In Great Britain October 13, 1941

2 Claims. (Cl. 16—128)

This invention relates to spectacles and has for its subject an improved form of joint which is applicable to spectacles of which the frames and sides are made of a material such as tortoise shell, imitation tortoise shell, Celluloid, xylonite or other like substances, with or without a metal base, insert or covering.

The joints of spectacles of the kind above referred to have the separate parts thereof provided with plates which are riveted to the frame and to the sides. For these joints a considerable amount of expensive metal is used and as the joint must be constructed extremely accurately, a considerable amount of machining is necessary. The fixing of the plates to the parts involves various processes and requires skilled operatives.

It is the object of the present invention to reduce the amount of metal and the number of parts used, to eliminate the use of highly skilled labour and to produce joint parts which can be assembled and fitted in the shortest possible period of time. A further object of the invention is an improved form of joint of which the parts can be secured to the frame and sides of spectacles without separate rivets.

According to the present invention a joint for connecting a side to a frame of spectacles provided with three apertured lugs, has two of the lugs stamped from a strip of sheet metal, each of these lugs being formed with a single shank, of square cross-section, and with a hole for the passage of a hinge pin, screw or the like, the shanks being passed through one of the parts of the spectacles, for example the frame, in spaced relation. A single lug, adapted to be secured to a side may be stamped from a strip of sheet metal with two spaced shanks, each of square cross-section, and a hole for the passage of a hinge pin, screw or the like. The pair of spaced lugs may be stamped out or fabricated as a single unit with a connecting bridge.

The invention is also applicable to spectacles of which the sides are reinforced. When applied to spectacles of this character, the reinforcing wire may be looped or coiled so as to form an eye or hole for the passage of a hinge pin, screw or the like.

The frame and sides are provided with circular holes for the reception of the square shanks, the diameter of the holes being greater than the side of the shank but less than the diagonal of the shank, so that when the shank is forced into the hole it completely fills the hole and is held firmly therein without any liability of turning or becoming detached under normal conditions of use.

The invention will now be described by way of example, with reference to the accompanying drawing, wherein:

Figure 1 shows a perspective view of a pair of spectacles;

Figure 2 shows a plan view of a joint between a side and a frame of spectacles;

Figure 3 shows a front elevation of Figure 2;

Figure 4 shows a view of Figure 2 looking in the direction of the arrow;

Figure 5 shows a plan view of a lug with a single shank;

Figure 6 shows a plan view of a lug with two shanks;

Figures 7, 8 and 9 show a plan, side view and end view of two lugs, each with a single shank formed as a unit;

Figures 10 and 11 show a plan and side view of a reinforcing wire fitted with a lug;

Figures 12 and 13 show plan views of reinforcing wires formed respectively with a coil and a loop; and Figure 14 shows a partial plan of spectacles in which abutting surfaces of the side and frame are at right angles to the front of the frame.

Figures 1, 2, 3 and 4 show spectacles and portions thereof of which the sides 1 are connected to the frame 2 by a joint formed of three apertured lugs, 3, 4, 5, two 3, 5 of which are secured to the frame 2, and the other 4 to the side 1. The two lugs 3, 5 in the frame 2 are spaced apart a sufficient distance to receive between them the lug 4 on the side 1.

The two lugs 3, 5 which are secured to the frame 2 are each provided with a single shank 6, whilst the lug 4 secured to the side 1 is provided with two shanks 7, 8, the end of these shanks being adapted to be riveted over.

The lugs 3, 4, 5 are stamped or punched from a strip of sheet metal suitable for the purpose, such as nickel silver or German silver.

During this stamping operation a hole 9 is also punched in the lugs 3, 4, 5 for the passage of a hinge pin 10, screw or the like. The hole 9 in the lug 4 secured to the side 1 is preferably slightly larger than the holes 9 in the lugs 3, 5 secured to the frame 2, in order to avoid a seizing up on the hinge pin 10, screw or the like.

The lugs 3, 4, 5 are stamped or punched from a strip of sheet metal and their shanks are square in cross-section.

A lug 4 (Figure 6) when stamped from sheet metal is substantially of rectangular shape with the apertured end rounded, whilst the two shanks 7, 8 are spaced apart a distance substantially equal to the thickness of a shank.

A lug 3, 5 (Figure 5) with a single shank 6 is substantially similar in appearance to the lug 4 with two shanks 7, 8 except that one of the shanks is omitted.

Instead of using two separate lugs 3, 5 each with a single shank 6, these two lugs may be formed as a unit. For this purpose the two lugs 11, 12 (Figures 7, 8 and 9) are stamped from a strip of sheet metal with a connecting bridge 13 which is preferably located between the apertured ends 14. This bridge 13 is of such a length that after bending the bridge 13, so as to bring the two holes or eyes into register with one another, as shown in Figures 8 and 9, there is sufficient clearance 15 between the two lugs 11, 12 to receive between them the lug on the other part.

In order to secure the lugs in position the frame 2 and sides 1 are provided with circular holes of which the diameter is greater than the side of a shank, but less than the diagonal of the shank 6, 7, 8 so that when the latter is forced into the hole it substantially fills the same and is firmly and securely held therein without any liability of turning. The ends of the shanks 6, 7, 8 are riveted over in the usual manner.

When the sides 1 are provided with a reinforcing wire 16 (Figures 10, 11) this wire 16 is drilled when drilling the side 1 for the reception of the shanks 7, 8 of the apertured lug 4. The reinforcing wire 16, at the point at which the shanks 7, 8 are to pass therethrough, is flattened as indicated at 17, and in forcing the shanks 7, 8 through the holes the corners of the shanks 7, 8 are stripped off or torn away almost completely, so that the shanks substantially fill the holes in the reinforcing wire 16. The shanks 7, 8 also pass through the material of the sides 1, and the outer ends of the shanks are riveted over.

In an alternative arrangement in which the sides 1 are reinforced, the reinforcing wire 18, before being embedded in the side 1, is looped as indicated at 19 (Figure 13) or coiled as indicated at 20 (Figure 12), the loop 19 or coil 20 being adapted to project to fit between the spaced lugs 3, 5 on the frame 2 so that a hinge pin 10, screw or the like may be passed therethrough.

The invention is applicable to spectacles in which the sides butt against the frame with abutting surfaces at right angles to the front of the frame, as indicated at 21 (Figure 14), or by means of bevelled surfaces 22, 23 (Figure 2).

By means of the present invention there is effected a considerable economy in metal and labour.

What I claim is:

1. In a spectacle hinge the combination comprising three lugs, each of said lugs being stamped from a strip of sheet metal, each of said lugs having a hole therein located centrally towards one end thereof, each of two of said lugs including a shank of square cross section, each side of said shank being equal to the thickness of said lug, said shank forming one side of said lug and being located to one side of a plane passing diametrically through the hole in the corresponding lug, said third lug including a pair of spaced shanks of square cross section, each side of each of said shanks being equal to the thickness of said third lug, said shanks being spaced apart a distance equal to the side of the shanks, said shanks being located on opposite sides of a plane passing diametrically through the hole of said third lug and forming the sides of said third lug, said third lug being located between said first two lugs, with the holes in said lugs in register, the shanks of the first two lugs being in superposed relations to one of the shanks of the third lug, and a hinge pin member engaging said registering holes.

2. In a spectacle hinge according to claim 1, the combination with said two first mentioned lugs of a bridge piece formed integrally with the shanks of said two first mentioned lugs.

MAX WISEMAN.